United States Patent
Dwyer (10) Patent No.: US 8,163,662 B2
(45) Date of Patent: Apr. 24, 2012

(54) LIGHTWEIGHT, DURABLE ENCLOSURES AND LAMINATES FOR MAKING THE SAME

(75) Inventor: Matthew J. Dwyer, Wilmington, DE (US)

(73) Assignee: W. L. Gore & Associates, Inc., Newark, DE (US)

(*) Notice: Subject to any disclaimer, the term of this patent is extended or adjusted under 35 U.S.C. 154(b) by 44 days.

(21) Appl. No.: 12/465,222

(22) Filed: May 13, 2009

(65) Prior Publication Data
US 2010/0288321 A1 Nov. 18, 2010

(51) Int. Cl.
*B32B 5/22* (2006.01)
*E04H 15/54* (2006.01)

(52) U.S. Cl. .......... 442/76; 135/115; 135/124; 442/289; 428/196; 428/351; 428/315.9

(58) Field of Classification Search .......... 135/115, 135/117, 124, 137, 96; 442/76, 203, 208, 442/286, 289; 428/334–338, 343, 351, 411.1, 428/196, 315.5, 315.9; 156/60
See application file for complete search history.

(56) References Cited

U.S. PATENT DOCUMENTS

| | | | |
|---|---|---|---|
| 3,586,596 A * | 6/1971 | Ainsworth et al. | 442/35 |
| 3,953,566 A | 4/1976 | Gore | |
| 4,302,496 A | 11/1981 | Donovan | |
| 4,340,384 A | 7/1982 | Nomi | |
| 4,532,316 A | 7/1985 | Henn | |
| 4,925,732 A | 5/1990 | Driskill et al. | |
| 4,969,998 A | 11/1990 | Henn | |
| 5,539,072 A | 7/1996 | Wu | |
| 5,814,405 A | 9/1998 | Branca et al. | |
| 5,885,738 A | 3/1999 | Hannon | |
| 6,018,819 A | 2/2000 | King et al. | |
| 6,541,589 B1 | 4/2003 | Baillie | |
| 6,716,778 B1 * | 4/2004 | Hottner | 442/199 |
| 6,777,356 B2 * | 8/2004 | Sadato et al. | 442/76 |
| 7,306,729 B2 | 12/2007 | Bacino et al. | |
| 7,549,431 B1 * | 6/2009 | Farnworth et al. | 135/115 |
| 7,572,321 B2 * | 8/2009 | Yamakawa et al. | 96/11 |
| 7,704,598 B2 * | 4/2010 | Jain et al. | 428/316.6 |
| 2007/0009679 A1 | 1/2007 | Holcombe et al. | |
| 2009/0077724 A1 | 3/2009 | Courtney | |
| 2010/0129629 A1 * | 5/2010 | Tee et al. | 428/220 |

FOREIGN PATENT DOCUMENTS

| | | |
|---|---|---|
| EP | 0 890319 | 6/1998 |
| EP | 1 514484 | 9/2004 |
| EP | 1568485 | 8/2005 |
| EP | 2027996 | 2/2009 |
| WO | 2006/124064 | 11/2005 |

OTHER PUBLICATIONS

PCT/US2010/001145, International Search Report, Jul. 20, 2010, 6 pages.
PCT/US2010/001144, International Search Report, Aug. 26, 2010, 6 pages.

* cited by examiner

*Primary Examiner* — Winnie Yip
(74) *Attorney, Agent, or Firm* — Amy L. Miller (57) ABSTRACT

A lightweight enclosure is described that has an exterior film surface. The lightweight enclosure comprises a laminate having a porous outer film. The laminate is moisture vapor transmissive and flame resistance (passing CPAI-84), and abrasion resistance on the outer film surface thereby remaining durably liquidproof. The lightweight enclosure may be a single wall tent and is formed from a laminate having sufficient oxygen permeability to sustain life while enclosure openings are closed.

13 Claims, 6 Drawing Sheets

# LIGHTWEIGHT, DURABLE ENCLOSURES AND LAMINATES FOR MAKING THE SAME

FIELD OF THE INVENTION

Described, herein, is a lightweight, air permeable enclosure having an exterior non-textile surface. Further described are lightweight laminates for making the enclosures.

BACKGROUND OF THE INVENTION

Lightweight enclosures that provide some protection from environmental conditions are known, such as tents, bivy bags, bivy sacks, and the like. Polyester and nylon materials used to construct lightweight enclosures are coated to provide water resistance or waterproofness, and can be printed to achieve a desired aesthetic.

Lightweight tent constructions are typically considered as having either a double wall construction that has a separate rain fly and tent body, or a single wall construction having only a tent body comprised of, for example, a laminate material, and having no separate rain fly. Double wall tents rely on a rain fly to provide waterproofness by being positioned over a tent body otherwise constructed of highly air permeable and water permeable mesh wall fabric. However, the addition of the rain fly adds weight and bulk to the overall total construct. Also, double wall tent products having a lightweight rain fly material, such as nylon, typically use a polyurethane coating or silicone coating for waterproofness. Disadvantageously, coated materials fail to provide long-term waterproof durability. Typical laminates used for single wall tents have many layers to insure long-term water resistance, but as a result, are heavy and have high water weight gain when rained upon thereby making them unsuitable for certain applications. Moreover, the laminates of single wall tents are not air permeable and typically lack sufficient oxygen permeability to sustain the life of the occupants when the tent is closed, and often lack adequate flame resistance.

Coatings are frequently applied to enclosure materials to achieve flame resistance and UV stability; however, the coatings are susceptible to cracking in cold climates, as well as abrasion and other mechanical challenges that may induce failure. Alternatively to achieve flame resistance, flame-resistant materials, such as those sold under the tradename Nomex®, are often used. Unfortunately, these meta-aramid textiles show significant deterioration of tensile strength after exposure to UV radiation, a common challenge in the field.

Tents formed as a single wall construct can have lower weight and less bulk than the double wall tents by eliminating the waterproof fly. However, current lightweight single wall constructions using coated lightweight materials such as coated nylon, do not have long-term liquid resistance and do not reliably pass certain flame resistance requirements that are important to some tent users. Single wall tents using materials that can achieve higher levels of flame resistance use multiple layers of higher weight fabric, adding bulk and weight to the construct.

Composite waterproof fabric for enclosures have been described. For example, in U.S. Pat. No. 4,302,496, composites for tent walls are described that are reported to be lightweight and flame or fire resistant. The composite has at least three plies, namely a outer woven ply and an inner woven ply, and a middle ply of polytetrafluoroethylene. It is stated that tensile strength and tear resistance are imparted to the composite by the inner woven ply, while abrasion resistance is provided to the composite by the outer woven ply, and waterproofness and wind resistance are provided by the middle ply. Despite the description of the composite as lightweight, the composite fabric embodiments described disadvantageously have a weight reported to exceed 5.4 oz/yd$^2$ making it too heavy and bulky for certain applications.

SUMMARY OF THE INVENTION

A lightweight enclosure is described that has an exterior film surface. The lightweight enclosure comprises an exterior film surface having properties such as abrasion resistance, thereby remaining durably liquidproof. The lightweight enclosure is formed from a laminate having sufficient oxygen permeability to sustain life while the enclosure openings are closed. A lightweight air permeable laminate is also described that comprises an outer film surface, and can be formed to have properties such as durable liquidproofness, flame resistance (passing CPAI-84), and can be colorized.

In one embodiment, a single wall tent is described that achieves desirable attributes of a double wall tent, having air permeable walls and liquidproofness, without the requirement of a rain fly, while further achieving the attributes of light weight and packability previously associated with a single wall tent construct. Advantageously, the single wall tent described herein, having an exterior film surface that is durably liquidproofness, has sufficient oxygen permeability to sustain life when closed without auxiliary equipment. Enclosures are made from laminates that are durably liquidproof and have high tear strength and abrasion resistance at performance levels previously thought to be unobtainable in constructs having an outer film surface.

Advantageously, in one embodiment a lightweight laminate weighs less than 8 oz/yd$^2$, is flame resistant (passing CPAI-84), is durably liquidproof up to 0.7 psi for 3 minutes after abrasion testing, while simultaneously having sufficiently high oxygen ($O_2$) permeability ($O_2$ permeability greater than 2 m$^3$/m$^2$ bar-hour) to sustain life when used to formed a closed shelter.

DESCRIPTION OF THE DRAWINGS

The operation of the present invention should become apparent from the following description when considered in conjunction with the accompanying drawings, in which.

DETAILED DESCRIPTION OF THE INVENTION

A laminate is described that has an outer film surface that can be used in making high performance enclosures such as single wall tents, bivy bags, coverings and the like. The laminate outer film surface is designed to face outwardly toward the environment forming enclosures having an exterior film surface. The laminate having an outer film surface may be designed to have a multiplicity of properties such as a colorized outer film surface, durable liquidproofness, oxygen permeability, air permeability, flame resistance, low water pickup, and high moisture vapor transport. In addition, the laminate having the outer film layer may be oleophobic, have high tear strength and have abrasion resistance. A single wall enclosure, such as a tent, having an exterior film surface is also described having characteristics, such as light weight, low water pickup, abrasion resistant durable liquidproofness, fire resistance, air permeability, and having a colorized exterior surface. In one embodiment, a single wall tent is described having sufficient $O_2$ permeability when closed to sustain life.

Figure 1:
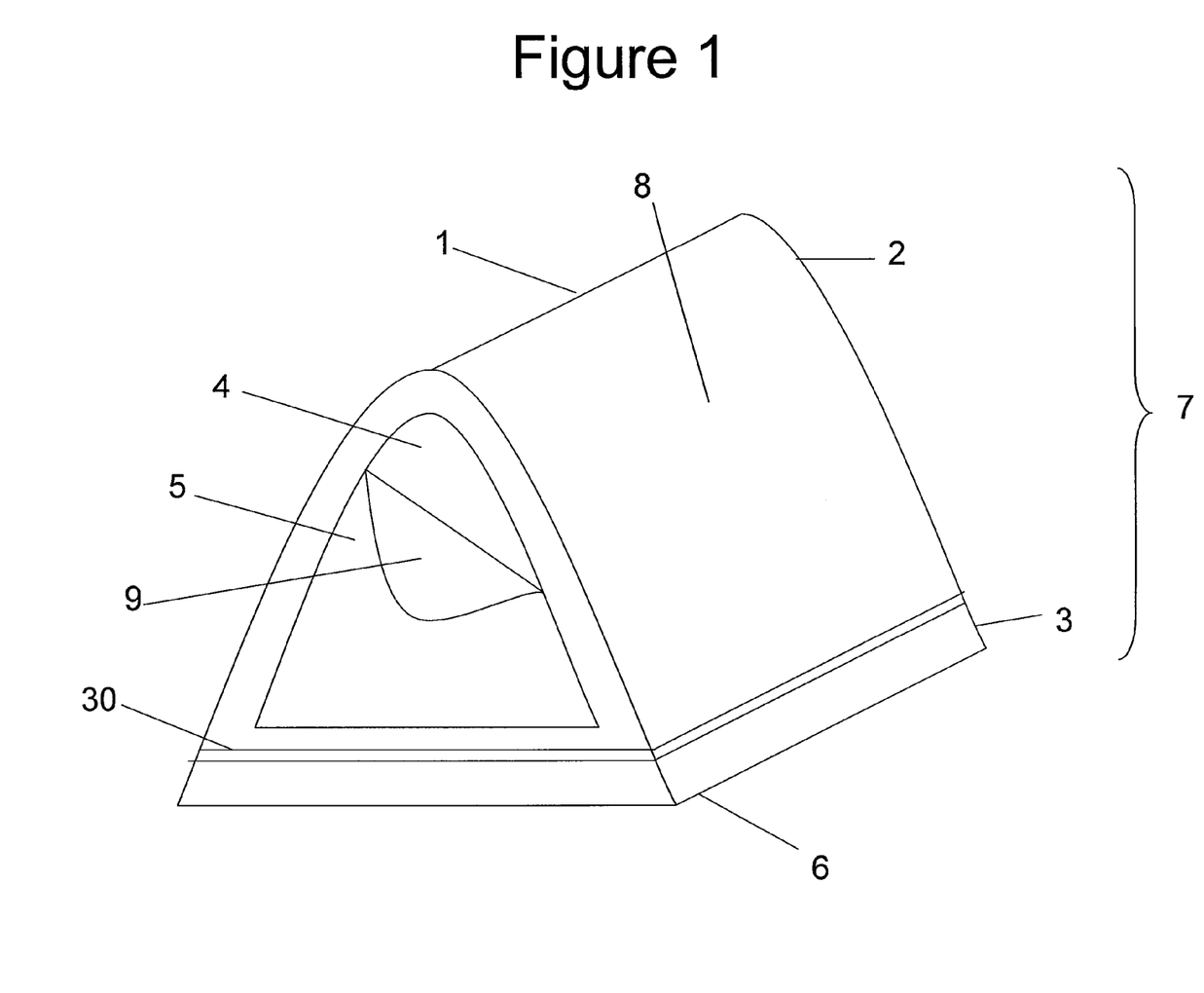
FIG. 1 is perspective view of one embodiment of an enclosure in the form of a tent.

With reference to the Figures, an enclosure is exemplified in FIG. 1, that illustrates a perspective view of a single wall tent (1) having a tent upper portion (2) and a tent lower portion (3). An opening (4) with a door (5) is provided for ingress and egress of a user of the tent, and that can be sealed for protection from the environment. In one embodiment a lightweight tent is designed wherein the tent upper portion (2) comprises greater than 70% of the surface area of the tent, and a tent lower portion (3) that comprises less than about 30% of the surface area of the tent. In some embodiments, the tent lower portion extends from the tent bottom (6) up the tent walls (7) for up to about 6 inches so that the seam (30) is above the level of the ground, also known as a 'bathtub' bottom.

The tent upper portion comprises a tent exterior non-textile surface (8) and a tent interior surface (9). The tent upper portion is formed from a laminate, examples of which are depicted in the cross-sectional illustrations of FIGS. 2, 3, and 4. Laminates (20) useful in constructing the upper portion (2) of a tent (1) comprise a porous outer film (21) attached to at least one additional layer (22) that provides, for example, dimensional stability to the laminate. The porous film (2) and the at least one additional layer (22) are attached by discontinuous attachments (23) to maintain air permeability through the laminate. The laminates (20) have an outer film surface (24) and an inner surface (25). The laminate inner surface (25) is the surface of the outermost at least one additional layer (22) that is opposite the surface closest to the porous film (21).

Figure 2:
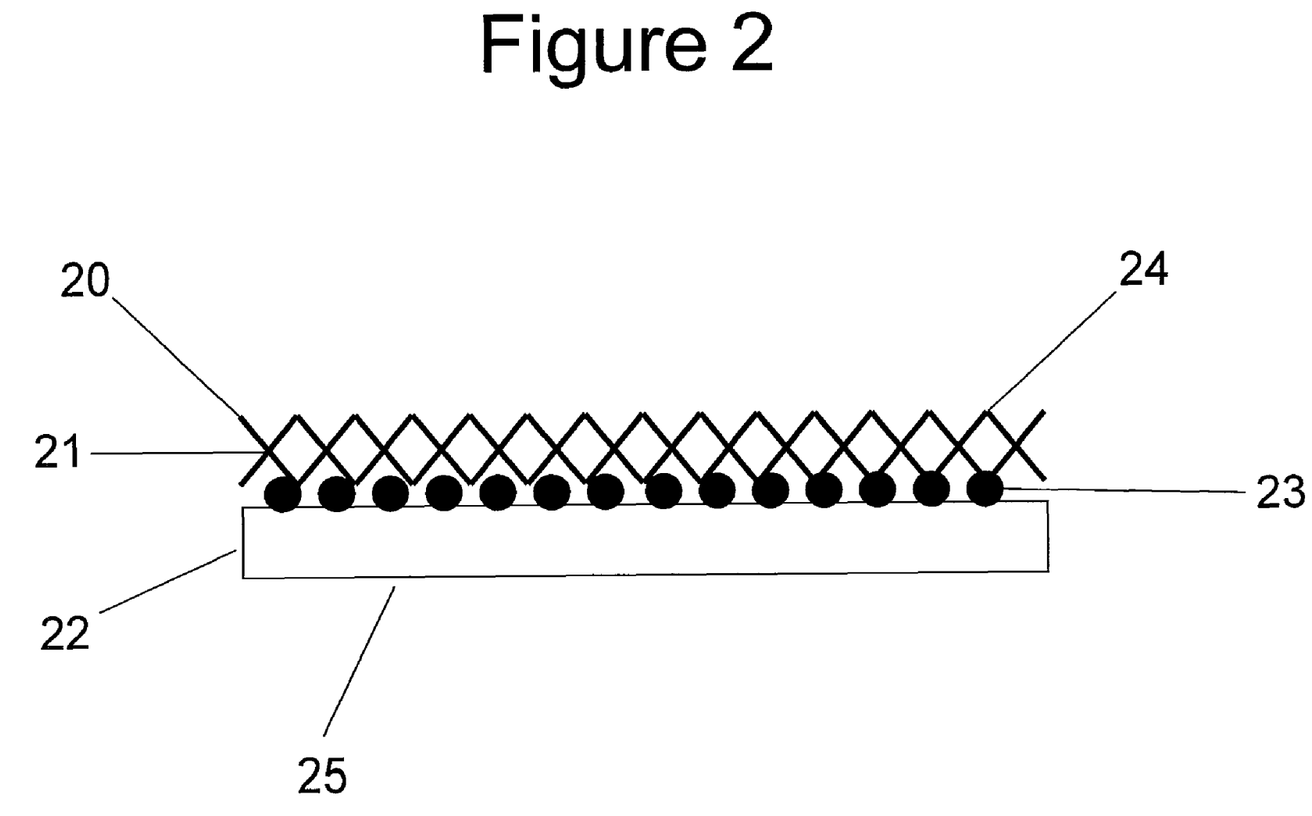
FIG. 2 is a cross-sectional representation of one embodiment of a laminate for use in an enclosure.

With reference to FIGS. 1 and 2, the exterior non-textile surface (8) of the tent upper portion (2) comprises the outer film surface (24) of the outer porous film (21) layer of the laminate (20). The tent inner surface (9) comprises the laminate inner surface (25) that, in this embodiment, is the surface of the at least one additional layer (22) opposite the surface attached to the outer porous film (21). Thus where the at least one additional layer (22) attached to the porous film (21) is a textile, the tent inner surface (13) is a textile.

Figure 3:
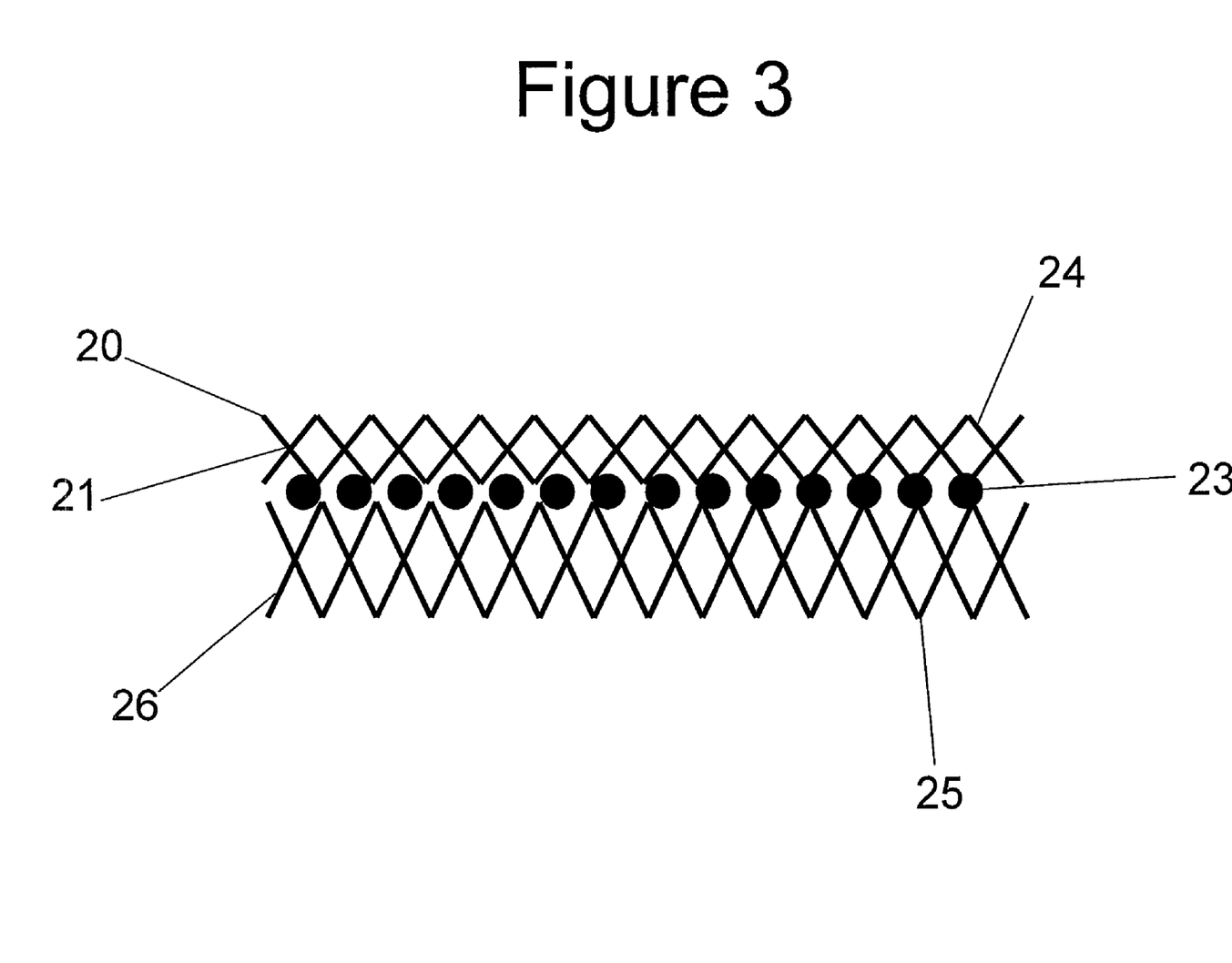
FIG. 3 is a cross-sectional representation of one embodiment of a laminate for use in an enclosure.
Figure 4:
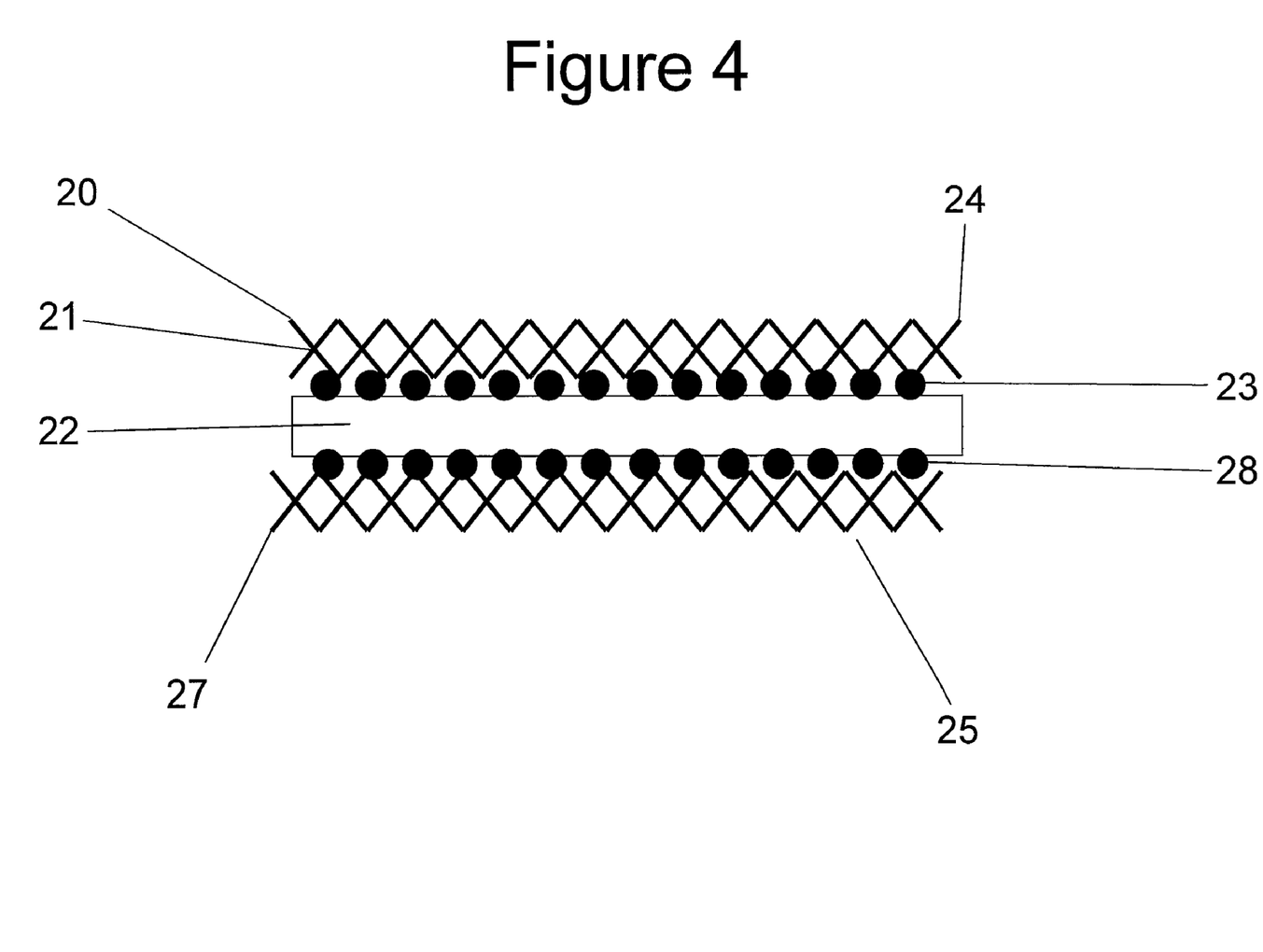
FIG. 4 is a cross-sectional representation of one embodiment of a laminate for use in an enclosure.

In one embodiment, as illustrated in FIG. 3, the at least one additional layer of the laminate (20) may be a second porous film (26) attached to the outer porous film (21) by discontinuous attachments (23). In further embodiment as exemplified by FIG. 4, where the at least one additional layer (22) is a textile layer, the laminate may also comprise a second porous film, the porous inner film (27), attached to the textile layer (22) with discontinuous attachments (23). Therefore, where the enclosure inner surface (9) is the surface of the laminate opposite the outer film surface (24), the enclosure inner surface (9) may also comprise a porous inner film (27) surface.

The enclosures described herein are made from a durably liquidproof laminate is formed that does not leak initially (when tested to 0.7 psi for a duration of three minutes), and also does not leak after 1000 Martindale abrasion cycles on the outer film surface when tested according to the Liquidproof Test described herein.

In other embodiments, enclosures described herein are made from laminates that have an initial hydrostatic resistance greater than 40 psi, or greater than 60 psi, or greater than 80 psi, or greater than 90 psi or greater than 100 psi, when tested according to the Hydrostatic Resistance test described herein. Laminates can be formed having good hydrostatic resistance after a challenge such as abrasion or contamination by a contaminant. In some embodiments, durable laminates are formed that after abrasion testing, having a hydrostatic resistance greater than or equal to 40 psi, or greater than or equal to 60 psi, or greater than or equal to 80 psi, or greater than or equal to 90 psi, after 1000 abrasion cycles on the outer film surface, when tested according to the Hydrostatic Resistance After Abrasion Challenge test described herein. In another embodiment, a durable laminate is formed showing a hydrostatic resistance greater than 30 psi both initially and after contamination with chemicals such as diethyltoluamide (DEET) when tested according to the Hydrostatic Resistance After DEET Contamination test, described herein.

For enclosures such as tents and bivy bags, the laminates described are oxygen permeable having an $O_2$ diffusion rate per unit area of the enclosure (e.g. tent) that provides sufficient diffusion of oxygen into the enclosure to sustain the life of the occupants when the enclosure is closed. In some embodiments, laminates are provided having an oxygen permeability greater than or equal to about 2 $m^3/m^2$ bar Hr, providing sufficient oxygen permeability to sustain life when formed as an enclosure as described herein. By "sufficient diffusion of oxygen" it is meant that the tent upper portion laminates described herein allow sufficient air into the enclosure to maintain oxygen in levels at greater than or equal to about 16%, thus replenishing oxygen consumed by the occupants over time. In other embodiments, laminates are formed that have $O_2$ permeability greater than or equal to about 4 $m^3/m^2$ bar Hr, or greater than or equal to about 6 $m^3/m^2$ bar Hr, or greater than or equal to about 8 $m^3/m^2$ bar Hr when tested according to the Oxygen Permeability test described herein.

For example, laminates that are air permeable, having Gurley number less than about 400 seconds, having porous passages that are continuous from one surface of the laminate to the other, and therefore throughout the thickness of the laminate, may provide sufficient diffusion of oxygen for use in the enclosure. In other embodiments, laminates may be formed having a Gurley number less than 300 seconds, less than 200 seconds, less than 100 seconds, when tested according to the Gurley Air Flow test described herein. Laminates that comprise monolithic coatings or layers that result in a Gurley number greater than about 400 seconds may therefore be unsuitable to provide adequate oxygen permeability to sustain life in applications for closed enclosures.

In order to provide liquidproofness to a laminate, porous films have small enough pores to maintain liquidproofness in laminate form, while maintaining adequate porosity to provide sufficient $O_2$ diffusion through the laminate to sustain life when formed as a closed enclosure. For example, in one embodiment a liquidproof single wall tent is formed having greater than about 70% of a liquidproof, air permeable tent upper portion being comprised of the laminates described herein. The laminate of this embodiment comprises a film having a Gurley number greater than 10 seconds and a laminate having a Gurley number greater than 15 seconds, in order to achieve a structure of sufficiently tight porosity to attain a desired level of liquidproofness, while simultaneously, the laminate has a Gurley number less than 400 seconds providing sufficient $O_2$ diffusion through the laminate to sustain life when closed.

Moisture vapor transmission, or breathability, is required to minimize the formation of condensation on the inner surfaces of an enclosure, for example, when used in cold climates. Laminates described herein, are breathable, having a moisture vapor transmission rate (MVTR) greater than 5000 g/m²/24 hours, or greater than 10000 g/m²/24 hours, or greater than 15000 g/m²/24 hours, when tested according to the method described.

In some embodiments, the laminates having an outer film surface are flame-resistant, passing a Vertical Flame Test described herein, as specified by CPAI-84 (Canvas Products Association, International).

Lightweight laminates described herein can be formed having a weight less than about 8 oz/yd², or less than about 6 oz/yd², or less than about 4 oz/yd², or less than about 2 oz/yd². Lightweight laminates weighing less than 8 oz/yd², can be formed having a Puncture Propagation Tear (PPT) greater than 1 lb force ($lb_f$) in the warp and fill direction, when tested according to the test described herein. Lightweight laminates can also be formed having a PPT greater than 2 $lb_f$ in the warp and fill direction, or having a PPT greater than about 2.5 $lb_f$ in the warp and fill direction. Lightweight laminates having a weight less than 8 oz/yd² can also be formed having a break strength in the warp and fill direction of greater than about 50 $lb_f$, or greater than 60 $lb_f$, when tested according to the Grab Break Strength Test described herein.

It is desirable to make porous films that are sufficiently permeable to oxygen to sustain life when used to form laminates for enclosures such as tents and bivy bags. In addition, abrasion resistant films should be used where it is desirable to have laminates that are liquidproof both initially and after being subject to an abrasion challenge. Porous air permeable films can abrade readily rendering the materials permeable to water. To provide properties such as durable liquidproofness after an abrasion challenge, some laminates described herein comprise membranes having a ball burst load greater than 17 $lb_f$, or a ball burst load greater than about 19 $lb_f$, when measured according to the Ball Burst test described herein. Membranes having an average modulus greater than 40 MPa, or an average modulus greater than about 60 MPa, or an average modulus greater than about 80 MPa, when tested according to the test described herein, also have been used to form the laminates described herein. Membranes having an average maximum load greater than 10N, when tested according to the test described herein, are also useful in forming durable laminates.

The outer porous film (21) includes, for example, polymeric films made from fluoropolymers. Suitable fluoropolymers may comprise, for example, expanded fluoropolymers, such as polytetrafluoroethylene (PTFE), that can be processed to form porous or microporous membrane structures. For example, PTFE can form a microporous membrane structure characterized by nodes interconnected by fibrils when expanded, for example, according to the process taught in patents such as in U.S. Pat. Nos. 3,953,566, or 7,306,729. In one embodiment, an expanded PTFE fluoropolymer film is made according to U.S. Pat. No. 6,541,589, having comonomer units of polyfluorobutylethylene (PFBE). Expanded PTFE (ePTFE) fluoropolymers may comprise polytetrafluoroethylene (PTFE) that has from about 0.05% by weight to about 0.5% by weight of comonomer units of PFBE based upon the total polymer weight.

In one embodiment, the outer porous film (21) layer is an expanded polytetrafluoroethylene (PTFE) having a microstructure characterized by nodes interconnected by fibrils, wherein the pores of the porous film are sufficiently tight so as to provide liquidproofness and sufficiently open to allow the diffusion of air through the film. In one embodiment, this is accomplished by providing an ePTFE membrane having a Gurley number greater than 10 seconds and less than 400 seconds. In one embodiment, a porous film is made by first compounding a polytetrafluoroethylene (PTFE) resin which is suited to produce a node and fibril microstructure upon stretching. The resin is blended with an aliphatic hydrocarbon lubricant extrusion aid such as a mineral spirit. The compounded resin is formed into a cylindrical pellet and paste extruded by known procedures into a desired extrudable shape, preferably a tape or membrane. The article can be calendered to the desired thickness between rolls and then thermally dried to remove the lubricant. The dried article is expanded by stretching in the machine and/or transverse direction, for example, according to the teachings of U.S. Pat. Nos. 3,953,566 or 7,406,729, to produce an expanded PTFE structure characterized by a series of nodes which are interconnected by fibrils. The ePTFE article is then amorphously locked by heating the article above the crystalline melt point of PTFE, for example between about 343°-375° C.

The porous node and fibril structure of an expanded fluoropolymer membrane enables coating materials and/or print materials to adhere to this porous substrate. The low surface energy of fluoropolymer films, such as ePTFE, is known to repel most surface treatments, thereby providing a challenge for applying durable coatings, such as those comprising colorants. However, in one embodiment, a coating composition comprises a binder and a colorant to colorize a film surface used as the outer film surface of the laminate. The coating composition coats or encapsulates the nodes and/or fibrils of the expanded fluoropolymer structure forming a durable aesthetic appearance.

Films suitable for use as the outer film surface have a surface that when printed provides a durable aesthetic. Aesthetic durability can be achieved in some embodiments with colorant coating compositions that comprise a pigment having a particle size sufficiently small to fit within the pores of the porous substrate. For porous or microporous membranes, pigment particles having a mean diameter of less than about 250 nm are useful for forming durable color. The coating composition further comprises a binder system capable of wetting the porous substrate and binding the pigment to the pore walls. In one embodiment, the surface of the film can be colorized with a colorant to form a solid color or a pattern (design). Multiple colors can be applied using multiple pigments, or varying the concentrations of one or more pigments, or by both techniques. In one embodiment, a tent upper portion comprises a colorized exterior film surface having greater than 90% of the exterior film surface colorized by printing or other application technique, while retaining porosity through the laminate from one surface of the laminate to the other, thereby maintaining suitable $O_2$ permeability when used as a closed enclosure.

Coating compositions comprising colorants can be applied to provide a variety of colors and designs, such as solid, camouflage and print patterns. Coating compositions may comprise one or more colorants suitable for use in printing camouflage patterns such as woodland and desert patterns. In one embodiment, a coating composition suitable for use in printing a woodlands camouflage pattern on to a surface of a porous film comprises black, brown, green, and light green colorant. In an alternate embodiment a coating composition comprises brown, khaki, and a tan colorant suitable for printing a desert camouflage pattern. Other embodiments comprise compositions comprising colorants having shade variations within these two examples.

The coating composition can be applied to the membrane, forming a colorized outer film surface, by a several methods. Application methods for colorizing the porous film include but are not limited to transfer coating, screen printing, gravure printing, ink-jet printing, and knife coating. Additional topical treatments can be applied to the porous film that forms the outer film surface of the laminate or the exterior film surface of the enclosure, provided sufficient porosity throughout the laminate is maintained to remain air permeable. Additional treatments may be provided that impart functionality, such as but not limited to oleophobicity. Examples of oleophobic coatings include for example, fluoropolymers such as fluoroacrylates and other materials such as those taught in U.S. patent application Ser. No. 11/440,870.

At least one additional layer (22) is bonded to the inner surface of the outer porous film (21) of the laminate (20) providing dimensional stability to the laminate. The at least one additional layer should be selected to achieve a sufficient level of oxygen permeability to sustain life where used in a laminate for use in a closed enclosure. The at least one additional layer bonded to the film is a textile or non-textile. Textiles that provide dimensional stability to the composite, include for example dimensionally stable woven textiles, knits and non-woven. Where flame resistance (FR) is required, lightweight textiles may be used that are inherently flame resistant, comprising material such as FR fibers such as aramid fibers sold under the trade names Nomex® and Kevlar®, polybenzimidizole (PBI), and blends thereof, and modacrylic (such as modacrylic wrapped fiberglass). Other flame-resistant materials that may be used include fire resistant (FR) cotton, FR rayon, FR nylon, FR polyester, and the like.

Where the at least one additional layer (22) is a non-textile layer, such as a porous inner film (FIG. 3 at 26), the porous film may be the same as or different from the outer film layer. Where the porous inner film layer (26) is different than the outer film layer (21), it may be selected to provide properties such as dimensional stability, liquidproofness, and the like. In one embodiment, a laminate (20) is provided that comprises a outer porous film (21) that is selected having a larger median flow pore diameter to provide, for example, a durable printed surface, and that is attached by discontinuous attachments (23) to a stronger second porous inner film (26) to provide, for example, good laminate tear strength in the longitudinal and transverse directions. In other embodiments, the porous inner film is selected to provide good longitudinal and transverse break strength to the laminate.

Coatings can also be provided to the at least one additional layer to impart a variety of properties to the laminate. For example, a coating composition comprising a binder and a colorant can be applied to the at least one additional layer (22) to colorize the layer in a solid or patterned color having one or more than one color. The at least one additional layer in the form of a textile or a film can be colorized by the same or different technique, and by the same or different color or pattern, as the outer film. In one embodiment, a porous inner film (26) can be colored a dark color such as black, where it is desirable to provide the property of light blocking. By colorizing the porous inner layer of the laminate, light blocking can be provided without substantially increasing the laminate weight, instead of by traditional methods such as adding additional layers to block light. A laminate having a light blocking inner surface is useful in tent applications, for example, where it is desired to keep light originating inside the enclosure from being visible outside of the enclosure. In some embodiments, laminates are constructed that have a light transmission of less than 10% when measured according to the Transmission Optical Density test provided herein.

The outer porous film layer (21) and at least one additional layer (22) are bonded together in a manner that maintains continuous passages or pathways of porosity from one surface of the laminate to the other. Discontinuous attachments (23) are applied in a manner that maintains air permeability of the layers when laminated together as a composite. The discontinuous attachments may be in the form of an adhesive attachment, such as a discontinuous adhesive layer. Adhesive compositions include thermoset adhesives, such as polyurethane, flame-resistant polyurethane, and silicone. Thermoplastic adhesives include thermoplastic polyurethane and thermoplastic flame-resistant polyurethane. The porous membrane layer and the at least one additional layer are attached by adhesives through lamination processes, such as gravure lamination, spray adhesive bonding, and fusion bonding with a thermoplastic scrim. To maximize air permeability, discontinuous adhesive layer is used to join the layers.

In one embodiment a laminate is formed having one or more properties selected from a moisture vapor transmission rate >5,000 g/m$^2$/24 hours that passes flame resistance (according to CPAI-84), having a weight of $\leq$4.0 oz/yd$^2$ (measured according to ASTM D 3776), a tear strength $\geq$1.5 lb$_f$ warp and fill (when measured according to ASTM D 1424), a break strength $\geq$20 lb$_f$ in both warp and fill (when tested according to ASTM D 5035), liquidproof after abrasion testing (when measured by the Abrasion and Liquidproof tests), and a hydrostatic resistance of greater than or equal to 35 psi after abrasion testing.

Constructs made with the above described laminates include lightweight enclosures such as tents, including single wall tents, bivy bags (FIGS. 5a and 5b), and the like. A lightweight single-wall tent (1) formed, as exemplified in FIGS. 1 and 6a and 6b, comprises standard support poles (28). In FIGS. 1, 6a, and 6b, the tent opening (4) can be closed with a door (5) that is optionally located in either the tent upper portion (2) or tent lower portion (3) or in both the tent upper portion and tent lower portion, and can be shut by a closing means such as a zipper or hook and loop closure (29). Where the door (5) is located in the tent upper portion (2), it may be comprised of the material that forms the upper portion (2) or a different material. Where the door (5) is located in the tent upper portion (2), and the door (5) is made of a different material than the remainder of the tent upper portion (2), the material should be selected so that the desired air permeable, liquidproof, flame resistance, and/or lightweight characteristics imparted by the remainder of the tent upper portion (2) material are retained. The closing means (29) may be optionally resistant to penetration by water. A seam (30) is used to join the tent upper portion (2) and tent lower portion (3), by sewing, gluing or other mechanical joining. A liquidproof seam may be used, thereby providing a seam that will not leak or weep, for example, when challenged with a test fluid (such as water) at a pressure of at least 0.7 psi for a duration of at least 3 minutes.

In one embodiment, a single wall, two-person tent can be constructed having a weight less than about 8 lbs, including standard tent poles. In another embodiment, a lightweight single-wall one person tent, as illustrated in FIG. 6b, having an exterior film surface, has a weight less than 4 pounds and a pack volume less than 500 in$^3$, having a vestibule (31) in addition to a floor area (32) sufficient to hold, for example, a sleeping bag (33), formed from a flame resistant laminate that is abrasion resistant and therefore durably liquidproof, and has an O$_2$ permeability greater than or equal to 3 m$^3$/m$^2$ bar-hour.

Figure 5A:
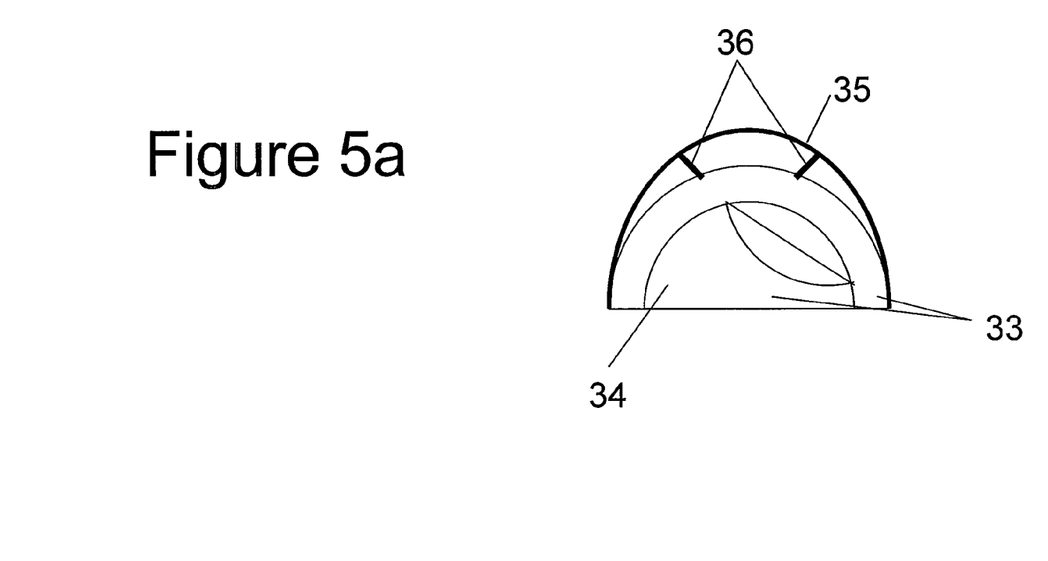
FIG. 5a is a front view of one embodiment of an enclosure in the form of a bivy bag.
Figure 5B:
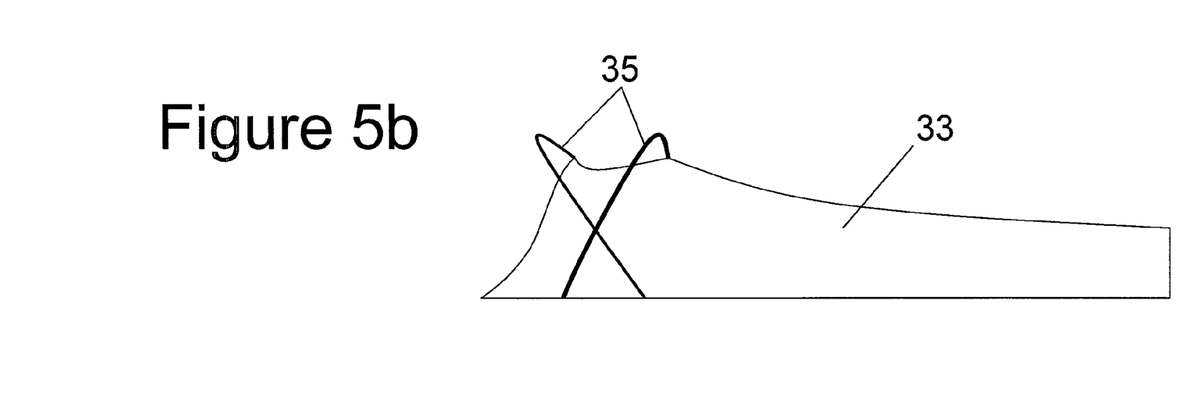
FIG. 5b is a side view of one embodiment of an enclosure in the form of a bivy bag.
Figure 6A:
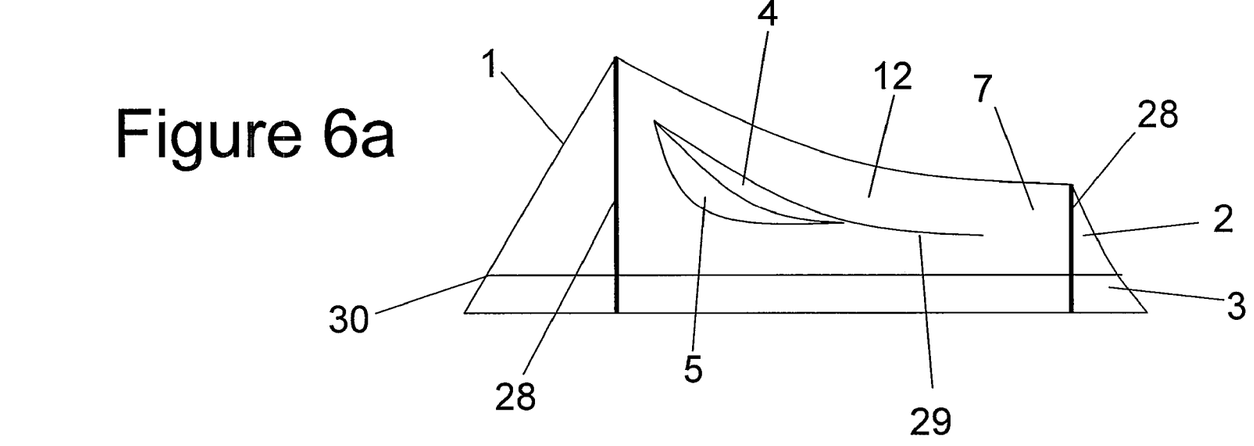
FIG. 6a is a perspective view of one embodiment of an enclosure in the form of a tent.
Figure 6B:
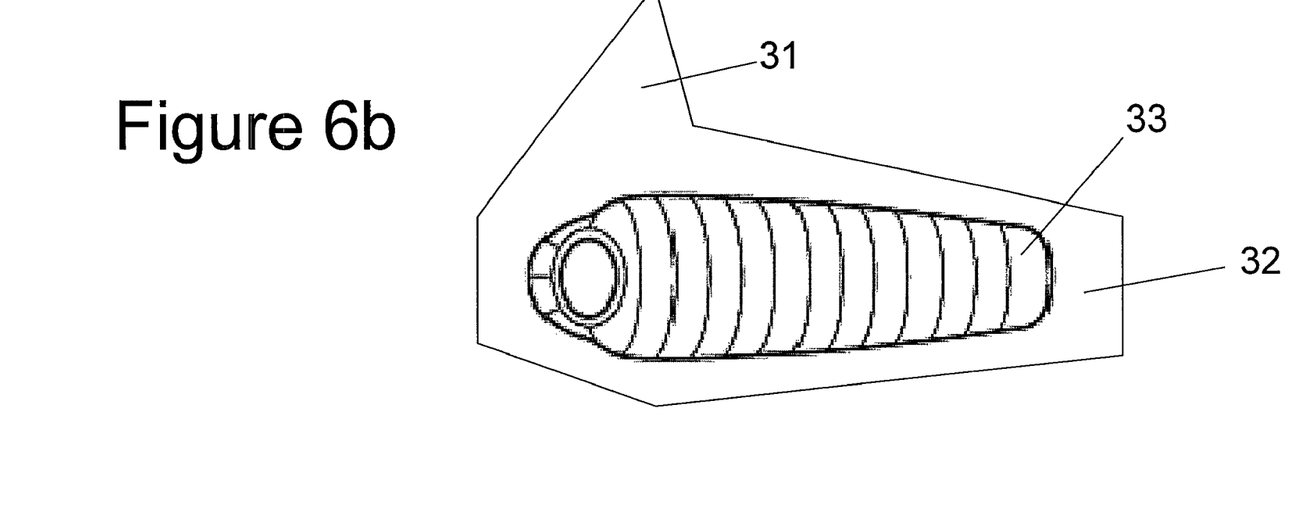
FIG. 6b is a top view of one embodiment of an enclosure in the form of a tent.

An embodiment of a bivy bag, as exemplified by FIGS. 5a and 5b, can be formed that is lightweight and durably liquid-proof. As illustrated in FIG. 5a, a bivy is constructed having an exterior film surface (33) and an opening with a door (34) for ingress and egress into the enclosure. The lightweight bivy is constructed having support poles (35) that are attachable to the enclosure by attachment means (36). The bivy can be constructed to have properties such as flame resistance, durable liquidproofness, and sufficient oxygen permeability to sustain life when closed.

In a further embodiment, an enclosure can be made that comprises the laminate (20) having an outer film surface (24), by using the enclosure in the place of a fly of a double-wall shelter. For example, a double-wall tent or bivy can be constructed having an enclosure with an exterior film surface, comprising laminates described herein, where the enclosure is designed as a fly for use over the remaining body of an existing double-wall tent. The enclosure advantageously has one or more properties selected from durable liquidproofness, low water pickup, abrasion resistance, high moisture vapor transmission rate, and flame resistance.

Test Methods

Mass Per Area

The mass per area of samples is measured according to the ASTM D 3776 (Standard Test Methods for Mass Per Unit Area (Weight) of Fabric) test method (Option C) using a Mettler-Toledo Scale, Model 1060. The scale is recalibrated prior to weighing specimens. Weights are recorded in ounces to the nearest half ounce. This value was converted to grams per square meter as reported herein.

Density for Membranes

To measure the density of the membrane material examples of the present invention and the comparative examples, property data measured on the samples were collected. As noted above, the 165 mm×15 mm samples were measured to determine their mass (using a Mettler-Toledo analytical balance model AB104) and their thickness (using a Kafer FZ1000/30 snap gauge). Using this data, a density can be calculated with the following formula:

$$\rho = \frac{m}{w * l * t}$$

where:
$\rho$=density (g/cc)
m=mass (g)
w=width (1.5 cm)
l=length (16.5 cm)
t=thickness (cm)

Thickness for Membranes

To measure the thickness of the membrane material examples of the present invention, a snap gauge (Kafer FZ1000/30) was used. Measurements were taken in at least four areas of each sample. The average value of these multiple measurements is reported as the thickness value for each membrane.

Gurley Air Flow

The air permeability of each sample was determined based on the time required to pass 50 cc of air through the sample according to FED-STD-191A Method 5452 with the following exception. This test method was followed except that specimens were sealed prior to testing to ensure a good seal and no leakage around edges during the test.

Median Flow Pore Size Test

The average pore diameter of the porous membrane was reported as Median Flow Pore size (MFP). To determine MFP, a sample membrane having a 25 mm diameter was obtained and wetted with perflouropolyether. The wetted sample membrane was placed in a Coulter Porometer wherein the average pore diameter of the final product was determined.

Toughness, Maximum Load, MTS, and Modulus Test Method

Sample preparation was accomplished by using a die punch to cut 165 mm long by 15 mm wide rectangular samples out of the ePTFE membrane web. The membrane web was placed on the cutting table such that it was free from wrinkles in the area where the sample was to be cut. The 165 mm×15 mm die was then placed on the membrane (generally in the center 200 mm of the web) such that its long axis is parallel to the direction that will be tested. The directions quoted in this publication will be measured in the longitudinal direction (parallel to the direction of travel during processing) and the transverse direction (perpendicular to the direction of travel during processing). Once the die is aligned, pressure is applied to it to cut through the membrane web. Upon removal of this pressure, the rectangular sample for testing should be inspected to ensure it is free from edge defects which may impact the tensile testing.

At least 3 samples in the longitudinal (L) and the transverse (T) directions should be cut to characterize the membrane web. Once samples have been prepared, they were measured to determine their mass (using a Mettler-Toledo analytical balance model AB104) and their thickness (using a Kafer FZ1000/30 snap gauge). Each sample was subsequently tested to determine its tensile properties using an Instron 5500 tensile tester running Merlin Series IX software (version 7.51). The samples were inserted into the tensile tester and held using Instron Catalog 2702-015 (rubber coated face plate) and 2702-016 (serrated face plate) grip plates such that each end of the sample is held between one rubber coated and one serrated face plate. The pressure applied to the grip plates was approximately 50 psi. The gauge length between the grips was set at 50 mm and the crosshead speed (pulling speed) was set to a speed of 508 mm/min. A 0.1 kN load cell was used to carry out these measurements and data was collected at a rate of 50 points/sec. The laboratory temperature should be between 68° F. and 72° F. to ensure comparable results. Finally, if the sample happened to break at the grip interface, the data was discarded.

At least 3 samples in the longitudinal and transverse directions should be successfully pulled (no slipping out of or breaking at the grips) in order to characterize the membrane web. The data analysis and calculations were performed with the Merlin software or any other data analysis package. First, the maximum load able to be supported by the sample during the tensile test for L and T directions was located. The maximum load for L and T was then normalized to the sample physical properties (thickness and density) via the following equation to calculate the matrix tensile strength for L and T directions.

$$MTS = F_{max} * \left(\frac{\rho_o * l}{100 * m}\right)$$

where:
MTS=Matrix tensile strength (MTS) in Mpa
$F_{max}$=maximum load measured during test (Newtons)
$\rho_o$=theoretical density for PTFE (2.2 grams/cc)
l=sample length (cm)
m=sample mass (grams)

Then, the average maximum load was calculated by averaging the maximum load for L with the maximum load for T. The average matrix tensile strength was calculated by averaging the matrix tensile for L with the matrix tensile strength for T.

The toughness for each sample was determined by integrating the stress strain curve from the sample to calculate the area below the curve, and averaged for three measurements for each of the L and T directions. This number represents the energy required to break the sample, reported as the sample toughness. Then, the average toughness was calculated by averaging the toughness L with the toughness for T.

The modulus of each sample is determined by taking the slope from the linear elastic portion of the stress-strain curve. First, the modulus in the longitudinal (L) and transverse (T) directions are calculated from the average of three measurements. Then, the average modulus is calculated by averaging the modulus of L with the modulus of T.

Ball Burst Strength

The test method and related sample mounting apparatus were developed by W. L. Gore & Associates, Inc. for use with a Chatillon Test Stand. The test measures the burst strength of materials such as fabrics (woven, knit, nonwoven, etc.), porous or nonporous plastic films, membranes, sheets, etc., laminates thereof, and other materials in planar form.

A specimen was mounted taut, but unstretched, between two annular clamping plates with an opening of 7.62 cm diameter. A metal rod having a polished steel 2.54 cm diameter ball-shaped tip applied a load against the center of the specimen in the Z-direction (normal to the X-Y planar directions). The rod was connected at its other end to an appropriate Chatillon force gauge mounted in a Chatillon Materials Test Stand, Model No. TCD-200. The load was applied at the rate of 25.4 cm/minute until failure of the specimen occurred. The failure (tearing, burst, etc.) may occur anywhere within the clamped area. Results were reported as the average of three measurements of the maximum applied force before failure.

Testing was done at ambient interior temperature and humidity conditions, generally at a temperature of 21° C. to 24° C. and relative humidity of 35% to 55%. Ball burst data can be expressed as the ball burst strength as a function of mass per area of the sample; mass per area of the sample can be determined from the product of density and thickness of the sample.

Moisture Vapor Transmission Rate Test (MVTR)

The moisture vapor transmission rate for samples was determined in accordance with ISO 15496 except that the sample water vapor transmission (WVP) was converted into MVTR moisture vapor transmission rate (MVTR) based on the apparatus water vapor transmission (WVPapp) and using the following conversion.

$$MVTR = (\text{Delta } P \text{ value} * 24) / ((1/WVP) + (1 + WVPapp \text{ value}))$$

Oxygen Permeability

Test samples were prepared by first cutting out circular samples of material layers to be tested, 11.2 cm diameter, using a suitable die. In these tests, samples were sealed between two chambers. The first chamber is challenged with a fixed concentration of oxygen; the second chamber is filled with nitrogen. During the test, an oxygen sensor is used to measure the concentration rise in the second chamber as a function of time. The value reported is the oxygen permeability reported in $m^3/m^2$-hr-bar.

The test equipment was comprised of a test cell equipped with oxygen sensors. Oxygen sensors having a range of 0-100%, Type FY 9600-O2, were obtained from Ahlborn Mess und Regelungstechnik GmbH in Holzkirchen, Germany. The test cell was cylindrical in shape and sealed at all ports to prevent any significant oxygen ingress. The test cell was equipped with circulating fan to maintain a well-mixed environment within the cell. A nitrogen supply was fed into the test cell. The testing procedure involved connecting the oxygen sensor from within the cells to a data recording unit, then connecting nitrogen supply line to measuring cells, switching on ventilators in measuring cells, calibrating the oxygen sensors at 12.8-13.0 mV ($\cong 20.9\%$ oxygen), and placing test samples over measuring cells. Sample measurements were performed while the samples were dry. The data recording unit had a sampling rate of one data point every 3 seconds. After 10 seconds, the nitrogen supply line was opened to fill measuring cells until all oxygen sensors have dropped below 3.0 mV ($\cong 5\%$ oxygen). The nitrogen supply line was then closed and the oxygen flow measured. Data collection was allowed to continue until all sensors were above 10.0 mV ($\cong 15\%$ oxygen); then the recording was stopped.

Evaluation of the results within the range of 5%-15% oxygen involved reading the data of each individual measuring cell from the data recording unit into the calculation program, and determining the average value of the three individual results along the fabric width. The calculations were based on the time required by one test sample in order to adjust the oxygen content of the measuring cell from 5% to 15% oxygen. The permeation P determined by this method was in units of $m^3/m^2$ h bar.

Puncture-Propagation Tear Resistance (PPT)

The puncture and propagation tear resistance (PPT) of samples was determined by following ASTM D 2582 entitled, "Standard Test Method for Puncture-Propagation Tear Resistance of Plastic Film and Thin Sheeting". The PPT data on each sample was generated with no deviations from this test method.

Hydrostatic Resistance

The initial hydrostatic resistance of each sample was determined in accordance with ASTM D751 Standard Test Methods for Coated Fabrics. The sample was oriented such that the outer film surface of the laminate was facing the water. The pressure was increased until the sample ruptured. The hydrostatic resistance reported was the hydrostatic pressure value at which the sample ruptured. This value was reported in pounds per square inch (psi).

Hydrostatic Resistance After Deet Contamination

The hydrostatic resistance after DEET (diethyl-meta-toluamide) contamination was determined in accordance with ASTM D751 Standard Test Methods for Coated Fabrics with the following exception. Three (3) specimens of the sample to be tested were laid flat, with the outer film surface of the laminate facing up on a 4-inch by 4-inch by ¼-inch, glass plate. Three (3) drops of diethyl-meta-toluamide containing 75% diethyl-meta-toluamide and 25% ethanol were applied to the center of each specimen. A second glass plate of the same dimensions was then placed on top of the specimen (or specimen assembly), and a four (4) pound weight was placed on top of the glass plate. After 16 hours, the specimens was removed from between the glass plates and tested immediately for hydrostatic resistance in accordance with hydrostatic resistance test method ASTM D 751 with the outer film surface of the laminate facing the water.

During testing, the pressure was increased until the sample ruptured. The hydrostatic resistance reported was the hydrostatic pressure value at which the sample ruptured. This value was reported in pounds per square inch (psi).

Hydrostatic Resistance After Abrasion Challenge

The hydrostatic resistance after abrasion challenge was determined in accordance with ASTM D751 Standard Test Methods for Coated Fabrics with the following exception. Each test specimen was abrasion tested in accordance with ASTM Standard Test Method D4966-98 (Martindale Test Method). The abradant selected was wool felt. The laminate was oriented so that the laminate outer film surface was abraded for 1,000 cycles using wool as the abradant. Each specimen was then tested for hydrostatic resistance in accordance with ASTM D 751 oriented so that the outer film surface facing the water.

Vertical Flame Test

Vertical flame resistance was determined according to ASTM D 6413 Standard Test Method for Flame Resistance of Textiles (Vertical Test). Methane gas (99% pure) was used along with a Vertical Flammability Tester (Model 7635A from United States Testing Co., Inc., Hoboken, N.J.). The test specimen size was 3 inches by 12 inches. Samples were conditioned at 70+/−2° F. and 65+/−2% RH for at least 24 hours before testing.

A specimen was said to be flame resistant if it passes the Vertical Flame test by having an afterflame of less than 2 seconds and having no observable melting or dripping (no melt-drip) during the test.

Grab Break Strength Test

The break strength of each sample was determined in accordance with ASTM D 5034 Standard Test Method for Breaking Strength and Elongation of Textile Fabrics (Grab Test) using the 'grab' type of specimen and constant rate of extension. Each clamp had a front jaw having dimensions of 1 inch by 1 inch and a back jaw having dimensions of 1 inch by 3 inches, with the larger dimension perpendicular to the direction of the application of force. Samples were conditioned at 70+/−2° F. and 65+/−2% RH for at least 24 hours before testing. 3 specimens per sample were tested and the average value for these 3 specimens reported in pounds-force ($lb_f$) as the grab break strength value.

Oil Repellency Test

In these tests, oil rating was measured using the AATCC Test Method 118-1983 when testing the outer most film side of laminate samples. Three drops of the test oil are placed on the sample surface. A glass plate is placed directly on top of the oil drops. After 3 minutes, the glass plate is removed and any excess oil blotted off the surface. The film side of the sample is visually inspected for a change in appearance indicating penetration or staining by the test oil. The oil rating corresponds to the highest number oil that does not cause visible staining on the film sample side being tested.

Abrasion (Martindale) Prior to Liquidproof (Suter) Testing

The test used for abrasion is the Abrasion Resistance of Textiles, ASTM Standard Test Method D. 4966-98 (Martindale Test Method). Sample laminates were subjected to a rubbing motion against either a piece of the same test sample, using the outer film surface as the abradant, or a piece of wool felt as the abradant, for 1,000 cycles, as follows.

A piece of abradant measuring about 5.5 inches square followed by a piece of the standard laminate of the same size was placed on the testing table. The machine mounting weight was placed on the table to flatten the samples. The abradant was secured to the table with the mounting weight in place, then the weight was removed to inspect for tucks or ridges. The specimen was then placed face down into the specimen holder. The assembled holder was placed on the machine with the correct abradant, and the required weight was added to give pressure on each specimen. The amount of pressure was 1.31±0.03 psi. The counter was set to record the desired movements, and the machine started. After 1,000 cycles, visual examination was done.

The abraded samples are visually inspected for any change in aesthetics. Samples are preconditioned then placed in a conditioned room at 70° F.±2° F. and 65±2% RH for at least four hours prior to testing.

Liquidproof Test (Suter)

Liquidproof testing was conducted as follows. Laminates were tested for liquidproofness by using a modified Suter test apparatus with water serving as a representative test liquid. Water is forced against a sample area of about 4¼-inch diameter sealed by two rubber gaskets in a clamped arrangement. Samples are tested by orienting the sample so that the outer film surface of the sample is the surface against which water is forced. The water pressure on the sample is increased to about 0.7 psi by a pump connected to a water reservoir, as indicated by an appropriate gauge and regulated by an in-line valve. The test sample is at an angle, and the water is recirculated to assure water contact and not air against the sample's lower surface. The surface opposite the outer film surface of the sample is observed for a period of 3 minutes for the appearance of any water which would be forced through the sample. Liquid water seen on the surface is interpreted as a leak. A passing (liquidproof) grade is given for where no liquid water is visible on the sample surface within 3 minutes. Passing this test is the definition of "liquidproof" as used herein. Samples having any visible liquid water, e.g. in the form of weeping, pin hole leak, etc. are not liquidproof and fail the test.

Transmission Optical Density Test

The transmission optical density at room temperature of the samples was measured with a desktop densitometer model TRX-N instrument supplied by the Tobias Associates, Inc of, Ivyland Pa. U.S.A. The device consists of a light source and a silicon photodetector with a spectral response of greater than 20% between 475 nanometers and 675 nanometers. This device is capable of measuring the optical density of films in both transmission and reflection modes. Transmission mode was used for all measurements.

Percent Transmission is a measurement that reflects the amount of incident light that is transmitted through a sample. Transmission is defined by the following equation:

$$T = 10^{(-OD)}$$

where OD=optical density.

The instrument requires around 10 minutes of warm up time. The test area was approximately 3 mm in diameter, and the specimen to be measured was large enough to completely cover the test area. The test procedure was conducted as follows 1. Zero was set by lowering the detector arm to the light port and pressing the control button
2. The digital readout was read zero, if not, the zero lever was pressed and released.
3. The result was recorded.
4. The test specimen was placed on the light table so that it covered the light port.
5. The detector arm was lowered to the sample covering the light port and the control button was pressed.
6. The result from the LED display was recorded.
7. The steps 5 through 8 were repeated for the remaining specimens The optical density measurement was displayed on three 7 segment light emitting diode display units, one for each digit. For the purpose of this patent, a material will be considered visually opaque when the percent transmission is less than 10% between 475 nm and 675 nm.

Water Pick Up Test

An 8"×8" square sample is weighed using a calibrated scale that reads to the nearest 0.1 mg, available from Mettler Toledo of Columbus, Ohio, product item number AG104. The sample is then placed in a hydrostatic tester of the sort described in ASTM D751 "Standard Test Methods for Coated Fabrics" section 41 through 49 "Hydrostatic Resistance Procedure B" with a 4.25" diameter circle challenge area. The sample is placed so that the laminate surface that was designed as the outer facing surface is challenged by the water, at 0.7 psi for 5 minutes. Take care to ensure that no residual water adheres or is absorbed by the back side of the sample during placement or removal, as this will alter the reading. After exposure, the sample is removed from the tester and weighed again on the aforementioned scale. All weight gain is assumed to be from water absorbed in the challenge area of 4.25" diameter circle because of the high clamp pressure used to hold the sample in place. The water pickup is based on this area using the following calculation to convert to grams per square meter.

Water pickup=(final sample weight−initial sample weight)/((4.25 inch*0.0254 m/inch/2)$^2$* π)

Without intending to limit the scope of the present invention, the following examples illustrate how the present invention may be made and used.

EXAMPLES

Example 1

A three-layer laminate was formed comprising an outwardly facing printed outer film surface, a non-colorized inner film surface and a flame-resistant textile laminated between the two film layers.

The flame-resistant textile was a 1.5 oz/yd$^2$ woven textile (1.7 denier per filament, cut to a staple length of 1.5"-2" NOMEX Type 462 (93% NOMEX® aramid fibers, 5% Kevlar® aramid fibers, 2% P-140) Gore PN WCBZ000) with the tradename Nomex® Synergy Lite.

An expanded polytetrafluorethylene (PTFE) membrane was made from PTFE containing PFBE according to U.S. Pat. No. 6,541,589, and processed into an expanded membrane comprising polytetrafluoroethylene (PTFE) according to the process taught in U.S. Pat. No. 3,953,566. The microporous expanded PTFE membrane was water vapor and air permeable, and had the properties shown as Membrane Example 1 (M1) in Table 1.

The laminate was constructed as follows. One membrane was laminated to one side of the woven textile using a flame-resistant, polyurethane, hot-melt moisture cure adhesive in a discrete-dot gravure pattern having approximately 35% coverage. The flame retardant polyurethane adhesive was prepared by first forming an adhesive resin in accordance with U.S. Pat. No. 4,532,316, and then adding in the reactor a phosphorus-based additive in an amount of about 20% by weight of the total polymer resin to get about 3% by weight elemental phosphorous content based on the weight of the total adhesive resin mixture.

The adhesive was applied to the first microporous expanded PTFE membrane. The first side of the textile was then laminated to the adhesive treated-side of the first microporous expanded film in a calendaring nip roll to form a two (2) layer laminate. After curing for about 24 hours at ambient conditions, the second microporous expanded PTFE membrane was laminated to the second side of the woven textile (the side opposite the first membrane) by applying the same adhesive to the second microporous expanded PTFE membrane and then adhering to the textile side of the two (2) layer laminate previously created. The adhesive was applied using the same discrete-dot gravure pattern having approximately 35% coverage. A three-layer laminate resulted having an expanded microporous PTFE membrane on both outer and inner laminate surfaces.

The three-layer laminate was printed on one membrane surface with a solvent based ink capable of wetting fluoropolymer membranes, to form the laminate printed outer film surface. The membrane surface of the three-layer laminate was printed in a camouflage pattern using multiple colored, solvent-based, pigment-containing inks and an Epson® solvent capable, ink-jet printer. The solvent ink was chosen so that it would water the low surface energy microporous fluoropolymer surface and be able to form the necessary droplets in the ink-jet print head. Pigments used had a mean particle size of less than about 250 nm.

The printed microporous expanded PTFE film was rendered oleophobic using a fluorocarbon polymer binder and wetting agents. The binder system was formulated by mixing about 2.6 g of Witcolate® ES2 (30% solution) (Witco Chemicals/Crompton Corporation, Middlebury, Conn.), about 1.2 g of 1-Hexanol (Sigma-Aldrich Chemical Corporation, St. Louis, Mo.), and about 3.0 g of fluoropolymer (AG8025, Asahi Glass, Japan) in about 13.2 g of deionized water. The printed microporous expanded PTFE film was hand coated with the mixture using a roller to a coating weight of approximately 3 g/m$^2$. The coating was cured at 190° C. for 2.5 minutes.

The resulting oleophobic, printed, microporous expanded PTFE outer film surface of the three-layer laminate had an oil rating of 6. Some properties and testing results of the final three-layer laminate are shown in Tables 2 and 3. The laminate weight was about 3.3 oz/yd$^2$.

TABLE 1

Membrane Properties

| | Membrane Example | | |
|---|---|---|---|
| | M1 | M2 | M3 |
| mass/area (g/m$^2$) | 20 | 30 | 18 |
| density (g/cm$^3$) | 0.66 | 0.7 | 0.46 |
| thickness (μm) | 30 | 50 | 39 |
| Gurely (second) | 21 | 120 | 10 |
| median flow pore size (nm) | 200 | 90 | 250 |
| ball burst load (lb$_f$) | 20 | 44 | 17 |
| maximum load (L/T/average) (N) | 8/19/14 | 20/48/34 | 6/13/10 |
| modulus (L/T/average) (MPa) | 29/158/94 | 25/255/140 | 12/68/40 |
| MTS (L/T/average) (MPa) | 55/145/100 | 20/221/120 | 50/106/78 |
| toughness (L/T/average) (MPa) | 24/20/22 | 64/40/52 | 19/13/16 |

TABLE 2

Laminate Properties.

| Example No. | Weight (oz/yd$^2$) | MVTR (g/m$^2$/day) | Gurley (s) | O$_2$ Permeability |
|---|---|---|---|---|
| 1 | 3.3 | 18,000 | 83 | 6 |
| 5 | 2.6 | 16,000 | 64 | 6 |
| 7 | 1.4 | 23,000 | 145 | 6 |

TABLE 3

Tear Strength, Hydrostatic Resistance, Flame Resistance and Break Strength for Laminates.

| Ex-ample No. | PPT Tear Strength | | Hydrostatic Resistance (psi) | | | Flame Resistance | Break | |
|---|---|---|---|---|---|---|---|---|
| | Warp (lb$_f$) | Fill (lb$_f$) | Initial | After Abrasion with wool | After DEET | Per CPAI-84 | Warp (lb$_f$) | Fill (lb$_f$) |
| 1 | 3.7 | 2.7 | 104 | 99 | 92 | Pass | 71 | 69 |
| 5 | 3.3 | 3.5 | 92 | 89 | 80 | Pass | 63 | 61 |
| 7 | 3.4 | 4.8 | 44 | 40 | 43 | Pass | 22 | 26 |

Example 2

A three-layer laminate was formed comprising an outwardly facing outer film surface, an porous inner film, and a flame-resistant textile laminated between the two film layers, where both the outer and inner film surfaces were colorized with a black colorant.

Film layers were produced from microporous expanded PTFE membranes described in Example 1. Prior to lamination with a flame-resistant textile as described in Example 1, the surface of the porous membranes were rendered oleophobic by treating them with an aqueous latex of an organic polymer having pendant perfluoroalkyl side chains obtained from W. L. Gore & Associates, Inc. prepared based on Example 1B in U.S. Pat. No. 5,539,072 (incorporated herein by reference) and containing about 0.7% by weight of carbon black (Vulcan® XC72, Cabot Corporation, Boston, Mass). The resulting carbon coated membranes were dried at 200° C. After drying, the coated films had oil ratings of 6. The Gurley number of each sample was virtually unchanged after the application of the oleophobic coating to the membrane, indicating that the pores were still open. The resulting coated expanded microporous PTFE membranes are herein referred to as the film layers.

The film layers and the flame-resistant textile were laminated according to Example 1 using the same adhesive and adhesive laydown described therein to form a three-layer laminate having identical outer and inner film surfaces.

The final three-layer laminate package had black colorized inner and outer film surfaces and had a weight was about 3.3 oz/yd$^2$. The laminate was tested for light tightness, or percent transmission, as measured by the Transmission Optical Density Test described herein. The results are reported in Table 4.

TABLE 4

Light Transmission of Laminates.

| Example No. | Percent Transmission |
|---|---|
| 2 | 0.01 |
| 3 | 0.01 |
| 5 | 0.01 |
| 7 | 5.0 |

Example 3

A three-layer laminate was formed comprising an outwardly facing printed outer film surface, an inner porous film colorized black, and a flame-resistant textile laminated between the two film layers.

Microporous membranes were made according to Example 1. One microporous expanded PTFE membrane layer was colorized black according to the method used Example 2 to form a colorized film layer. The colorized film was laminated to a flame resistant textile described in Example 1 to form a two-layer laminate. A second microporous membrane made according to Example 1 was laminated to the flame-resistant textile layer of the two-layer laminate to form a three-layer laminate. The black colorized film formed the porous inner film of the laminate.

The membrane surface on the side of the three-layer laminate opposite the black colorized film layer was printed with a desert camouflage pattern to form the laminate printed outer film surface. The outer porous film was printed according to the method of Example 1. The final three-layer laminate package had a colorized inner surface and printed outer film surfaces, and a weight was about 3.3 oz/yd$^2$, and a light transmission of about 0.01%

Example 4

A three-layer laminate was formed comprising an outwardly facing oleophobic printed outer film surface, a porous inner film colorized black, and a flame-resistant textile laminated between the two film layers.

The three-layer laminate of Example 3 was coated with an oloephobic coating on the camouflage printed outer film surface as follows. After printing, the printed outer film surface of the laminate was coated with 2-propanol (Sigma-Aldrich Chemical Corporation, St. Louis, Mo.) so that the printed outer porous film was completely wet. It was then immediately, in less than 30 seconds, coated with a fluoropolymer solution formulated by mixing about 6 g of fluorocarbon (AG8025, Asahi Glass, Japan) in about 14 g of deionized water. The outer porous film surface was hand coated with the mixture using a roller to a coating weight of approximately 3 g/m$^2$. The coated laminate was cured at about 180° C. for 2 minutes.

The final three-layer laminate had a colorized inner film surface and printed oleophobic outer film surface having an oil rating of 6 and a weight was about 3.3 oz/yd$^2$.

Example 5

A two-layer laminate was formed comprising an outwardly facing outer film surface and a flame-resistant textile.

The flame-resistant textile was a 1.5 oz/yd$^2$ woven textile (1.7 denier, Gore PN WCBZ000) with the tradename Nomex® Synergy Lite, described in Example 1. The microporous expanded PTFE membrane was according to Example 1, and colorized according to the method described in Example 2 to form a colorized outer film surface.

The lamination process was as follows. The colorized outer porous film was laminated to the woven textile using the flame-resistant, hot-melt, moisture curing polyurethane adhesive as described in and applied according to Example 1. The two-layer laminate weighed approximately 2.6 oz/yd$^2$ and a light transmission of about 0.01%. The two-layer laminate was tested for liquidproofness after abrasion testing and the results are reported in Table 5. Additional results are reported in Tables 2 and 3.

TABLE 5

Liquidproofness (Suter Test) Before and After Abrasion Challenge for Laminates.

| Laminate Example | Initial | Liquidproofness (Suter Test: 3 minutes at ~0.7 psi) After Abrasion with film/film | After Abrasion with wool/film |
|---|---|---|---|
| Ex. 5 (M1/textile) | pass | pass | pass |
| Ex. 6 (M3/textile) | pass | fail | fail |

Example 6

A two-layer laminate was formed comprising an outwardly facing outer film surface and a flame-resistant textile.

A water vapor and air permeable microporous polytetrafluoroethylene (PTFE) membrane was provided having the properties described in Table 1 (the membrane referred to as Membrane M3). The membrane was laminated to a layer of flame-resistant textile (as described in Example 1) in accordance with the method of Example 1.

The two-layer laminate from Example 5 was compared to the two-layer laminate from Example 6 using the Liquidproofness Test described herein. After 1000 Martindale abrasion cycles, the laminate made with Membrane M3 exhibited water leakage. The laminate made in Example 5 was durably liquidproof, showing no leakage after the same abrasion testing protocol.

Example 7

A two-layer laminate was formed comprising two microporous expanded fluoropolymer films laminated to each other.

A first microporous expanded PTFE membrane was produced in accordance with Example 1 having the properties provided in Table 1 (and referred to as Membrane M1), which formed the outer film surface of the laminate. The membrane was colorized black according to Example 2. A second PTFE membrane was provided that was made using the PTFE resin described in Example 1, expanded by processes taught in U.S. Pat. No. 3,953,566, to form a microporous having properties provided in Table 1 (and referred to as Membrane M2), forming the porous inner film of the two-layer laminate.

The membranes were laminated using the flame-resistant, hot-melt, moisture curing polyurethane adhesive described in Example 1, except that the lamination adhesive had 40 wt % of the phosphorous-based additive used in Example 1 instead of 20 wt %, providing an elemental phosphorous level of about 6 wt % based on the total weight of the lamination adhesive. The adhesive was applied using a discrete-dot gravure pattern to provide a 20% adhesive coverage. The laminate was formed having an outer film surface that was colored. The final two-layer laminate weighed approximately 1.4 oz/yd$^2$ and a light transmission of about 5%. Laminate test results are reported in Tables 2 and 3.

Example 8

A laminate having an outer film surface with an oleophobic coating was tested for water-pick up and compared to laminates having coated textile outer layers.

The laminate of Example 8, was constructed using Membrane Example 1, and the woven textile described in Example 1 above, with the membrane coated with an oleophobic coating as follows. The membrane side of the laminate was coated with 2-propanol (Sigma-Aldrich Chemical Corporation, St. Louis, Mo.) so that the printed film was completely wet. It was then immediately, in less than 30 seconds, coated with a fluoropolymer solution formulated by mixing about 6 g of fluorocarbon (AG8025, Asahi Glass, Japan) in about 14 g of deionized water. The film surface was hand coated with the mixture using a roller to a coating weight of approximately 3 g/m$^2$. The coated laminate was cured at about 180° C. for 2 minutes.

Comparative sample 1 was a commercially available material comprising a nylon textile (tightly woven) having a microporous polyurethane on one side and a durable water repellant (DWR) coating on the other side.

Comparative sample 1 was tested for water pick up on the DWR side and had a water pickup of about 11 g/m$^2$, compared to Example 8 which was tested on the film side, and had a water pick up of about 3 g/m$^2$.

Example 9

An air permeable, liquidproof single wall, two person tent was constructed comprising of a tent upper portion having an outer film surface, and a tent lower portion.

The tent upper portion is comprised of a laminate made according to Example 3 having a printed outer film surface, a colorized oleophobic inner surface, and a flame-resistant textile there between. The tent upper portion is joined to the lower portion using a sewn seam, and constructed so that the camouflage printed outer film surface of the laminate was oriented outwardly forming the tent outer film surface, and the colorized oleophobic inner film surface formed the interior tent surface.

The tent lower portion is comprised of a three-layer laminate that was constructed of a flame-resistant Nomex® Synergy Lite textile (described in Example 2) bonded to one side of a barrier membrane. The opposite side of the barrier membrane was bonded to a woven nylon textile (1.5 oz/yd$^2$ woven nylon Gore PN WMUX337B). The tent lower portion utilized a "bathtub" bottom design in order that the amount of seam that contacts the ground is minimized. A sewn seam was used to join the tent upper and lower portions, and the seam was sealed with Gore-Seam Tape (Gore PN 6GSAJ025BLKNM) to form a liquidproof bond.

The tent was designed as a two-person tent having a maximum height of 39 inches, a floor length of 86 inches, a floor width of 46 inches, and a floor area of 28 square feet. The tent floor material wrapped around the corners formed between the tent walls and the tent bottom. The tent floor material extended up the tent wall approximately 6 inches forming the tent lower portion. The tent of this example had door openings approximately 2 ft. by 3 ft. at both ends and a vents approximately 6 inches by 10 inches on either side of the top of the tent.

The full-size, two-person tent had a cylindrical packed size diameter of 6 inches and a cylindrical packed length of 20 inches. The weight of this cylindrically packed tent, including the support poles was 6.25 lbs.

Example 10

A single-wall, one-person tent was constructed comprising of a tent upper portion having an outer film surface, and a tent lower portion, as depicted in FIGS. 6a and 6b.

The upper portion is comprised of a laminate made according to Example 1. The tent upper portion is joined to the lower portion using a sewn seam, and the tent upper portion was constructed so that a colorized outer film surface was oriented outwardly forming the tent exterior film surface.

The tent lower portion is comprised of same the three-layer laminate used in Example 9 for the tent lower portion. The tent lower portion utilized a "bathtub" bottom design to minimize the amount of seam that contacts the ground. The sewn seam is sealed with Gore-Seam Tape (Gore PN 6GSAJ025BLKNM) to form a liquidproof bond. The sewn seam was seam taped to insure liquidproofness. The dimension of the tent of this can be seen in Table 6.

The tent floor material wrapped around the corners formed between the tent walls and the tent bottom. The tent floor extended up the tent wall approximately 6 inches so that the seam between the tent lower portion and tent upper portion materials was not located on the bend. The tent of this example had door opening approximately 2 ft. by 4 ft. on its side and no vents.

The full-size, one-person tent had a cylindrical packed size diameter of 4 inches and a cylindrical packed length of 14 inches. The weight of this cylindrically packed tent, including the support poles was 2.2 lbs. A comparison of properties of this single person tent was conducted with a current commercial double wall tent of a similar design (Mountain Hardwear® Sprite 1 (referred to herein as MHW).

TABLE 6

Single wall Tent Construction Compared to Commercially Available Double Wall Tent.

|  | MHW Sprite ® 1 | Example 10 tent |
| --- | --- | --- |
| Packaged Weight | 3.45 lb/1.57 kg | 2.2 lbs |
| tent floor | 70D nylon taffeta 3000 mm PU | 3L laminate WMUX337607CZ |
| fly fabric | 75D polyester taffeta 1500 mm PU | unnecessary |
| poles | Atlas ® 7001 | Atlas ® 7001 |
| canopy fabric(a) | 20D nylon knit mesh | 3L film-textile-film |
| canopy fabric (b) | 68D polyester ripstop DWR | unnecessary |
| floor area | 17.50 sq ft/1.63 sq m | 17.50 sq ft/1.63 sq m |
| vestibule area | 5.00 sq ft/0.46 sq m | 5.00 sq ft/0.46 sq m |
| interior height | 3.08 ft in/93.98 cm | 3.08 ft in/93.98 cm |
| packed diameter | 6.00 in/15.24 cm | 4.00 in |
| packed length | 19.00 in/48.26 cm | 18.00 in |
| packed volume | 536 in³ | 226 in³ |

In addition to being air permeable and liquidproof, the single wall tent of Example 10 has a lighter weight and smaller pack volume than that of the commercial tent.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An air permeable, durably liquidproof laminate having an outer film surface, comprising
   a liquidproof microporous fluoropolymer film that forms the outer film surface, wherein the microporous fluoropolymer film comprises an expanded fluoropolymer membrane, and
   at least one additional layer comprising a porous film laminated to the liquidproof microporous fluoropolymer film on a side opposite the outer film surface with a discontinuous adhesive layer;
   wherein the laminate has an $O_2$ permeation greater than 2 $m^3/(m^2$ bar-hour), and is liquidproof at 0.7 psi for three minutes after 1000 abrasion cycles on the outer film surface.

2. The air permeable, liquidproof laminate of claim 1 wherein the laminate has a weight less than about 8 oz/yd².

3. The air permeable, liquidproof laminate of claim 1 wherein the laminate has a weight less than about 6 oz/yd².

4. The air permeable, liquidproof laminate of claim 1, wherein the laminate is flame resistant.

5. The air permeable, liquidproof laminate of claim 1 wherein the porous film is a flame-resistant porous film.

6. The air permeable, liquidproof laminate of claim 1 wherein the porous film is a microporous fluoropolymer membrane.

7. The air permeable, liquidproof laminate of claim 1, wherein the outer film surface is colorized.

8. The laminate of claim 1, wherein the microporous fluoropolymer film comprises an expanded polytetrafluoroethylene membrane.

9. The laminate of claim 1, wherein the discontinuous adhesive layer is flame resistant.

10. The laminate of claim 1, wherein the microporous film comprises a carbon coating on the surface.

11. The laminate of claim 1, wherein the laminate is flame resistant and passes CPAI-84.

12. The air permeable, liquidproof laminate of claim 1 wherein the porous film is the same as the liquidproof microporous fluoropolymer film.

13. The air permeable, liquidproof laminate of claim 1 wherein the porous film is different from the liquidproof microporous fluoropolymer film.

* * * * *